(12) United States Patent
Depies et al.

(10) Patent No.: US 10,694,251 B2
(45) Date of Patent: Jun. 23, 2020

(54) PREVENTING INADVERTENT VIEWING OF MEDIA CONTENT

(71) Applicant: The DIRECTV Group, Inc., El Segundo, CA (US)

(72) Inventors: Michael Edward Depies, Lawndale, CA (US); Jonathan Andrew Thompson, Torrance, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 15/440,272

(22) Filed: Feb. 23, 2017

(65) Prior Publication Data
US 2018/0242043 A1    Aug. 23, 2018

(51) Int. Cl.
| G06F 3/00 | (2006.01) |
| G06F 13/00 | (2006.01) |
| H04N 5/445 | (2011.01) |
| H04N 21/454 | (2011.01) |
| H04N 21/488 | (2011.01) |
| H04N 21/2187 | (2011.01) |
| H04N 21/433 | (2011.01) |
| H04N 21/442 | (2011.01) |
| H04N 21/482 | (2011.01) |

(52) U.S. Cl.
CPC ..... *H04N 21/4542* (2013.01); *H04N 21/2187* (2013.01); *H04N 21/4334* (2013.01); *H04N 21/44222* (2013.01); *H04N 21/482* (2013.01); *H04N 21/4882* (2013.01)

(58) Field of Classification Search
CPC .......... H04N 21/2187; H04N 21/4542; H04N 21/4334; H04N 21/4825; H04N 21/4882

USPC .................... 725/14, 20, 38, 86, 40, 43
See application file for complete search history.

(56) References Cited

U.S. PATENT DOCUMENTS

| 5,880,768 A | 3/1999 | Lemmons et al. |
| 5,978,920 A | 11/1999 | Lee |
| 7,774,816 B2 | 8/2010 | Bumgardner et al. |

(Continued)

FOREIGN PATENT DOCUMENTS

| CA | 2321462 | 4/2004 |
| DE | 3337204 | 4/1985 |

(Continued)

OTHER PUBLICATIONS

Kovacevic et al., "Enhanced Program Recording Mechanism for Hybrid Set-top Boxes," Proceedings of the International Conference on Applied Internet and Information Technologies, Oct. 23, 2015, pp. 58-61.

(Continued)

*Primary Examiner* — Nnenna N Ekpo
(74) *Attorney, Agent, or Firm* — Hartman & Citrin LLC (57) ABSTRACT

Concepts and technologies are disclosed herein for preventing inadvertent viewing of media content for a media program. A processor can detect an inadvertent viewing condition including exposing content for a media program including audio content and video content. The processor can create an alert that indicates the inadvertent viewing condition exists and that includes selectable options for actions to take for the inadvertent viewing condition. The processor can provide the alert to a video display and can further block output of the audio content and the video content to the video display.

19 Claims, 8 Drawing Sheets

(56) References Cited

U.S. PATENT DOCUMENTS

| | | | |
|---|---|---|---|
| 8,156,528 B2 | 4/2012 | Baumgartner et al. | |
| 8,407,749 B2 | 3/2013 | McLaughlin et al. | |
| 8,457,475 B2 | 6/2013 | Ellis et al. | |
| 8,566,871 B2 | 10/2013 | Knowles et al. | |
| 8,621,512 B2 | 12/2013 | Ellis et al. | |
| 8,713,595 B2 | 4/2014 | Lemmons et al. | |
| 8,887,202 B2 * | 11/2014 | Hunter | H04N 5/44543 |
| | | | 725/48 |
| 9,055,322 B2 | 6/2015 | Ellis et al. | |
| 9,319,724 B2 * | 4/2016 | Lewis, II | H04N 21/252 |
| 9,491,500 B2 | 11/2016 | Baumgartner et al. | |
| 9,824,232 B1 * | 11/2017 | Carmack | G06F 21/16 |
| 2001/0025374 A1 * | 9/2001 | Han | H04N 5/50 |
| | | | 725/25 |
| 2002/0026646 A1 | 2/2002 | Hoang | |
| 2002/0092021 A1 | 7/2002 | Yap et al. | |
| 2003/0040962 A1 * | 2/2003 | Lewis | G06Q 30/0225 |
| | | | 725/32 |
| 2004/0181814 A1 | 9/2004 | Ellis et al. | |
| 2006/0064715 A1 * | 3/2006 | Poslinski | H04N 7/0887 |
| | | | 725/28 |
| 2006/0218573 A1 | 9/2006 | Proebstel | |
| 2010/0037256 A1 * | 2/2010 | Rahman | H04N 7/17318 |
| | | | 725/38 |
| 2011/0052146 A1 * | 3/2011 | Murthy | H04N 7/17318 |
| | | | 386/243 |
| 2011/0154401 A1 | 6/2011 | Chow et al. | |
| 2011/0283309 A1 * | 11/2011 | Bliss | H04N 21/4532 |
| | | | 725/25 |
| 2012/0254910 A1 * | 10/2012 | Donoghue | H04H 60/31 |
| | | | 725/14 |
| 2013/0275519 A1 * | 10/2013 | Nichols | G06Q 10/107 |
| | | | 709/206 |
| 2014/0101706 A1 * | 4/2014 | Kardatzke | H04N 21/4334 |
| | | | 725/86 |
| 2014/0181197 A1 * | 6/2014 | Baggott | H04L 65/403 |
| | | | 709/204 |
| 2018/0152759 A1 * | 5/2018 | Miller | H04N 21/454 |

FOREIGN PATENT DOCUMENTS

| | | |
|---|---|---|
| EP | 1135928 | 9/2001 |
| JP | 2000261750 | 9/2000 |
| JP | 2000287179 | 10/2000 |
| WO | WO 2013164681 | 11/2013 |

OTHER PUBLICATIONS

Duford et al., "Recording and Delivery of HbbTV Applications," Proceedings of the 9$^{th}$ International Interactive Conference on Interactive Television, Jun. 29-Jul. 1, 2011, pp. 51-54.

Hietanen, Herkko, "Networked Digital Video Recorders and Social Networks," 2010 7$^{th}$ IEEE Consumer Communications and Networking Conference, Jan. 9-12, 2010, IEEE.

Ensor et al., "Blending IPTV Services," IPTV Workshop, International World Wide Web Conference, May 23, 2006.

Leroux, et al., "Experimental Characterisation of an Open Out-of-home MHP-based DVR Service," 8$^{th}$ European Conference on Interactive TV and Video, Jun. 9-11, 2010, Association for Computing Machinery (ACM), 2010.

* cited by examiner

PREVENTING INADVERTENT VIEWING OF MEDIA CONTENT

BACKGROUND

Conventional personal video recording and playback devices ("PVRs") can allow users to record media programs and to control playback of recorded programs including starting, stopping, pausing playback, and scrubbing (e.g., moving forward and backward) through the recorded program. The media program can include a broadcast media program obtained from a content delivery system or transmitted in various manners including via radio waves, such as over-the-air television transmissions, satellite television transmissions, Internet-based transmissions, cable television transmissions, or other manners. Users can view content of the media program while it is being received including while it is being recorded.

SUMMARY

The present disclosure is directed to preventing a user, viewer, or other entity (hereinafter referred to as a "user") from inadvertently viewing media content such as media content that corresponds to a media program. As used herein, the term "inadvertently" and variants thereof is used to refer to unintentionally, accidentally, casually, or unwittingly being exposed to the media content. Further, as used herein, the phrase "media program" and variants thereof is used to refer to a movie, program, event, or other presentation that can include audio and video components. It should be understood that a media program can include a broadcast media program. In addition, as used herein, the phrase "media content" is used to refer to data or other media that corresponds to a portion of the media program. The media content can include audio content and/or video content. A user's inadvertent exposure to media content that corresponds to a portion of a media program can reveal information to the user that can be out-of-context, can be revealed without knowledge of previous information or events of the media program, or the like, any of which can spoil surprises, expose plot features, and/or otherwise adversely impact the user's ability to enjoy the media program.

In some embodiments, the concepts and technologies disclosed herein can be used to prevent a user from inadvertently viewing media content for a media program that is currently being recorded. In some other embodiments, the concepts and technologies disclosed herein can be used to prevent a user from inadvertently viewing media content for a media program that is being recorded on a channel to which a device is tuned when a display is turned on. In yet other embodiments, the concepts and technologies disclosed herein can be used to prevent a user from inadvertently viewing media content for a media program that has been flagged as being at risk for inadvertent viewing when the device is tuned to receive the media program and when a display is turned on. As used herein, the term "viewing" and variants thereof, is used to refer to a user being exposed to media content via audio and/or video (audio/video) devices, which separately and/or collectively can be referred to herein as "viewing" the media content. Thus, it can be appreciated that as used herein, the phrase "inadvertent viewing" can be used to refer to unintentional, unwitting, and/or undesirable exposure to the audio/video content, which can include exposure to media content of a media program, including a media program being recorded, a media program being received for a live media program, a media program associated with a channel or station to which a device is tuned, combinations thereof, or the like.

When a device is recording a media program, the device can prevent a user from inadvertently viewing a portion of the media content being recorded for the media program. The device can detect an inadvertent viewing condition when the device detects that a video display connected to the device is on or being turned on and that the device is tuned to the same channel as the media content being recorded for the media program. The device can also detect an inadvertent viewing condition when the device determines that the device is being tuned to a particular channel while the device is recording media content on the particular channel. Further, the device can detect an inadvertent viewing condition when the device is tuned to receive a media program and the device determines that a flag in or associated with the media content for the media program indicates that the media content corresponds to a media program that is at risk for possible inadvertent viewing and the device determines that a video display connected to the device is on or is being turned on.

According to various embodiments, the device can create an alert or warning (hereinafter referred to as an "alert") when the device detects an inadvertent viewing condition. The alert can indicate that an inadvertent viewing condition exists and/or can warn a user that exposure to the media content may be undesirable. In some embodiments, the device can block audio content and video content from being output (e.g., provided to a video display). In some embodiments, the device can send the alert to the video display. The alert can be provided, in some embodiments, with one or more selectable options corresponding to options to view the media content, options to change channels, or other options. In some embodiments, a user can select a selectable option and the device can perform an action corresponding to the selectable option. In some instances, for example, a user can be prompted to push a particular button on a remote control or other input/output device to indicate selection of a selectable option.

According to one aspect of the concepts and technologies disclosed herein, a device is disclosed. The device can include a processor and a memory. The memory can store computer-executable instructions that, when executed by the processor, cause the processor to perform operations. The operations can include detecting an inadvertent viewing condition for a media program including exposing content for the media program. The content for the media program can include audio content and video content. The operations can include, in response to detecting the inadvertent viewing condition, creating an alert that indicates that the inadvertent viewing condition exists and that includes a selectable option that corresponds to an action to take in response to the inadvertent viewing condition. In addition, the operations can include blocking output of the audio content and the video content to the video display.

In some embodiments, the operation of detecting an inadvertent viewing condition can include determining that an attached video display is being turned on while the device is recording the media program on a first channel and the device is tuned to the first channel. In other embodiments, the operation of detecting an inadvertent viewing condition can include determining receipt of a command to display the media program on the video display while the device is recording the media program. In further embodiments, the operation of detecting an inadvertent viewing condition can include, while the device is tuned to a first channel receiving the media program, detecting a flag in the content for the media program as being at risk for possible inadvertent viewing, as well as determining either that a video display is being turned on while the device is tuned to the first channel, or receipt of a command to display the media program on the video display. The flag determined in the media program can include a content-provider flag created by a provider of the media program. In addition, the media program can include a broadcast of a live event.

In other embodiments, the operations of blocking the audio output and the video output to the video display can include controlling device circuitry to stop sending audio outputs and video outputs to the video display. The operations of blocking the audio output and video output can also include providing an overlay to the video display. The overlay can overlay the audio output and video output to the video display. The operations of blocking the audio and video output can additionally include providing a substitute media to the video display. Further, in some embodiments, the operations can further include maintaining recording of the media program while blocking the audio output and the video output to the video display.

In some embodiments, the selectable option can include one or more selectable options, and the user interface can include a message providing the one or more selectable options to the video display. The one or more selectable options can include a first option to view the first channel, and a second option to tune to a guide. The one or more selectable options can further include a third option to view a playlist menu, and a fourth option to watch the media program being recorded from a beginning of the recording. In additional embodiments of the device, the operations can include performing an action corresponding to the selectable option.

According to another aspect, a method is disclosed. The method can include detecting, at a device, an inadvertent viewing condition for a media program including exposing content for the media program. The content for the media program can include audio content and video content. The operations can include, in response to detecting the inadvertent viewing condition, creating, at the device, an alert that indicates that the inadvertent viewing condition exists and that includes a selectable option that corresponds to an action to take in response to the inadvertent viewing condition. In addition, the operations can include blocking, at the device, output of the audio content and the video content to the video display.

In some embodiments of the method, the operation of blocking the audio output and the video output to the video display can include providing, at the device, an audio/video overlay to the video display. The audio/video overlay can overlay the audio output and video output to the video display. The operations of blocking the audio and video output can additionally include providing, at the device, a substitute media to the video display. In some embodiments of the method, the selectable option can include one or more selectable options, and the user interface can include a message providing the one or more selectable options to the video display. The one or more selectable options can include a first option to view the first channel, and a second option to tune to a guide. The one or more selectable options can further include a third option to view a playlist menu, and a fourth option to watch the media program being recorded from a beginning of the recording.

According to yet another aspect of the concepts and technologies disclosed herein, a computer storage medium is disclosed. The computer storage medium can store computer-executable instructions that, when executed by a processor, cause the processor to perform operations. The operations can include detecting, at a device, an inadvertent viewing condition for a media program including exposing content for the media program. The content for the media program can include audio content and video content. The operations can include, in response to detecting the inadvertent viewing condition, creating, at the device, an alert that indicates that the inadvertent viewing condition exists and that includes a selectable option that corresponds to an action to take in response to the inadvertent viewing condition. In addition, the operations can include blocking, at the device, output of the audio content and the video content to the video display.

In some embodiments of the computer storage medium, the operation of blocking the audio output and the video output to the video display can include providing, at the device, an audio/video overlay to the video display. The overlay can overlay the audio output and video output to the video display. The operations of blocking the audio and video output can additionally include providing, at the device, a substitute media content to the video display. In some embodiments of the computer storage medium, the selectable option can include one or more selectable options, and the user interface can include an interactive on-screen message providing the one or more selectable options to the video display. The one or more selectable options can include a first option to view the first channel, and a second option to a guide. The one or more selectable options can further include a third option to view a playlist menu, and a fourth option to watch the media program being recorded from a beginning of the recording.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

The following detailed description is directed to concepts and technologies for preventing inadvertent viewing of media content. The concepts and technologies disclosed herein also can be used for detecting possible inadvertent viewing conditions, providing an interactive alert that alerts a user regarding an inadvertent viewing condition, blocking audio/video output from being provided to a video display when inadvertent viewing conditions are detected, providing a user interface with selectable options relating to the blocking of and/or inadvertent viewing of media content, or other features as illustrated and described herein. An inadvertent viewing application can be implemented on a computer device to enable inadvertent viewing functionality as illustrated and described herein.

The systems and devices illustrated and described herein can include, for example, content delivery systems, set-top boxes ("STBs"), PVRs, other devices as illustrated and described herein, and the like. The present disclosure is directed to preventing a user from inadvertently viewing media content for a media program including media content that is currently being recorded on a channel to which a device is tuned when a display is turned on or when the device is being tuned to the first channel. Further, the present disclosure is directed to preventing a user from inadvertently viewing media content for a media program that is currently being received on a channel to which a device is tuned if the media content has been flagged as being at risk for possible inadvertent viewing and if a display is turned on.

When a device is recording media content for a media program, the device can prevent a user from inadvertently viewing the media content. The device can detect an inadvertent viewing condition when the device detects that a video display connected to the device is being turned on, and the device is tuned to the same channel as the media content being recorded. The device can also detect an inadvertent viewing condition when the device determines that the device is being tuned to a channel on which the device is recording media content. Further, the device can detect an inadvertent viewing condition when the device determines a flag or other indicator that identifies the program as being at risk for a possible inadvertent viewing.

The device can create an alert that warns a user against viewing the media content. Further, in response to detecting the possible inadvertent viewing condition, the device can block audio and video from being provided or otherwise output to a video display. The device also can send the alert to the video display and/or can send one or more selectable options. The user can select a selectable option and the device can perform an action corresponding to the selectable option. In some instances, a user can be prompted to push a particular button on a remote control or other input/output device to indicate a selection of a selectable option.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
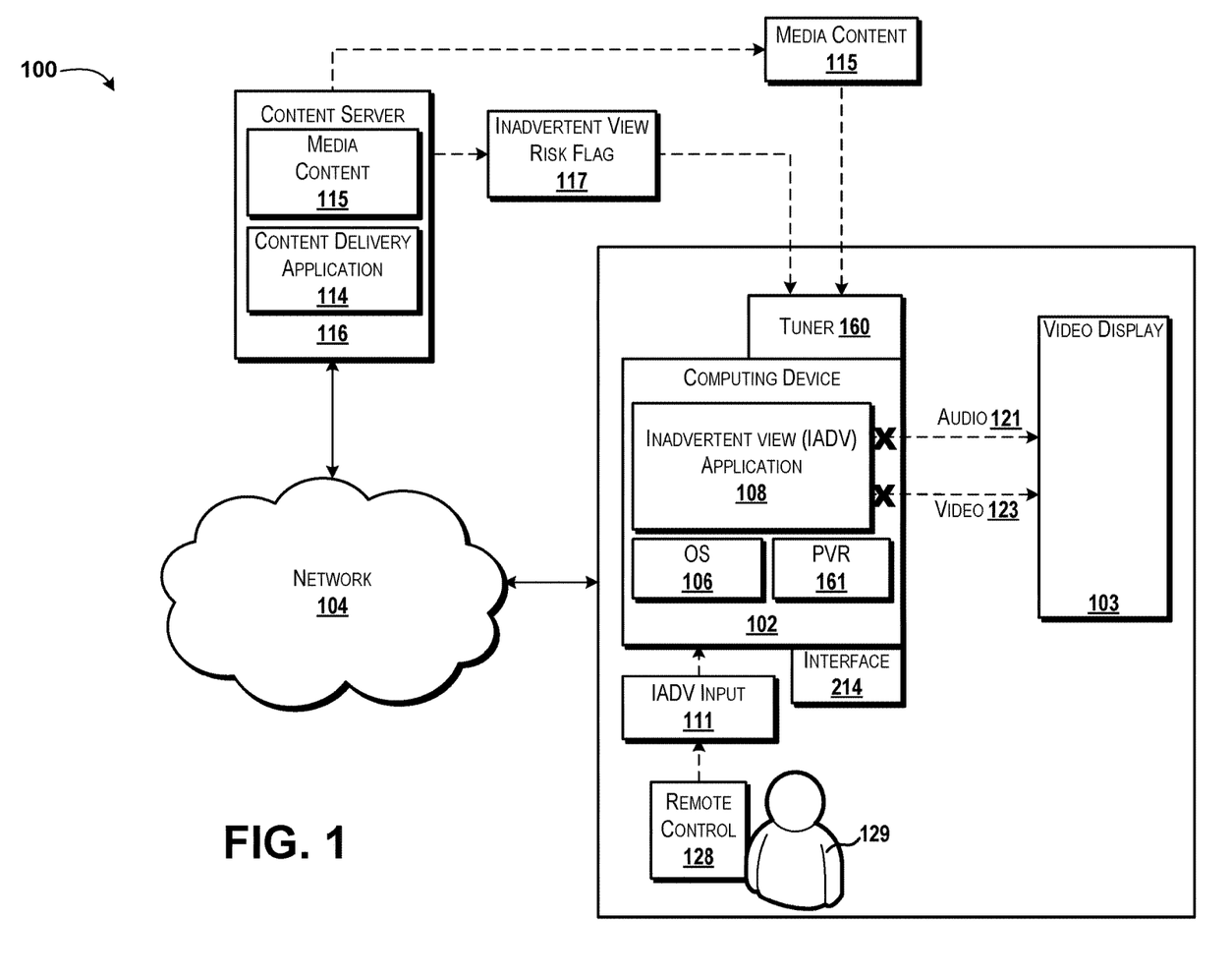
FIG. 1 is a system diagram of an illustrative operating environment for various embodiments of the concepts and technologies described herein.

Referring now to FIG. 1, aspects of an operating environment 100 for various embodiments of the concepts and technologies will be described. As shown in FIG. 1, the operating environment 100 can include a computing device 102, a network 104, and a content server 116. It should be understood, however, that various implementations of the operating environment 100 can include one or more than one computing device 102; zero, one, or more than one network 104; and zero, one, or more than one content server 116. As such, the illustrated embodiment should be understood as being illustrative, and should not be construed as being limiting in any way.

The functionality of the computing device 102 can be provided by one or more set top boxes, set-top units ("STUs") or other customer premises equipment ("CPE"), mobile telephones or smartphones, tablet computers, laptop computers, server computers, and/or other computing devices. One example embodiment of an architecture for the computing device 102 is illustrated and described in detail below with reference to FIG. 9. In some embodiments, the computing device 102 can be owned and/or operated by a carrier, for example a carrier that can provide media content 115 and/or other data to the computing device 102. The computing device 102 can operate in communication with and/or as part of the communications network ("network") 104, though this is not necessarily the case. It should be understood that the functionality of the computing device 102 can be provided by a single device, by two similar devices, and/or by two or more dissimilar devices. For purposes of describing the concepts and technologies disclosed herein, the computing device 102 is described herein as a set-top box. It should be understood that this embodiment is illustrative, and should not be construed as being limiting in any way.

The computing device 102 can execute an operating system 106 and one or more application programs such as, for example, an inadvertent view application (hereinafter referred to as the "IADV application") 108 and a personal video recorder application (hereinafter referred to as the "PVR application") 161. The functionality associated with the IADV application 108 and the PVR application 161 can include a standalone application and/or can be a part of other application programs such as a media content player/controller application (not shown) of the computing device 102, a playback application, or the like. The IADV application 108 and/or the PVR application 161 can manage media content 115 received, such as via a tuner 160, output the media content 115 received from the content server 116 directly to a video display 103 in the form of data for audio content 121 and video content 123, as well as bypass the media content 115 to recording media for recording a program (not shown) associated with the media content 115. Additional functionality of the IADV application 108 and the PVR application 161 will be described in more detail below after introducing additional aspects of the operating environment 100.

The operating environment 100 also can include one or more server computers such as, for example, the content server 116. The functionality of the content server 116 can be provided by various types of hardware and/or software for storing the media content 115, providing the media content 115 to various devices, adding/merging an inadvertent view risk flag 117 with the media content 115, and/or supporting other communications that may relate to providing media content. In the illustrated embodiment, the content server 116 can include hardware and software for supporting communications over a geographic area or other portion of a communications network such as the network 104. It should be understood that this example is illustrative and therefore should not be construed as being limiting in any way.

In addition to controlling the presentation of the media content 115 to a user, the IADV application 108 can also provide a user interface 214 (see FIGS. 2, 4, and 5) to indicate that inadvertent viewing of media content portions of the media content 115 may be undesirable, and/or to allow the user to choose how the media content 115 is (or is not) to be shown or output. In some configurations, the IADV application 108 can be configured to receive one or more IADV inputs 111. The IADV inputs 111 can be received from various sources such as, for example, a remote control device 128. The IADV inputs 111 may be received, for example, in response to the user interacting with the user interface 214 as discussed below with reference to FIGS. 2, 4, and 5. In some arrangements, the remote control device 128 can be a remote control 350 as shown in FIG. 3 and described further herein. The remote control 350 can send user inputs via infrared signals or other media to a receiver, a set-top box, to other devices, and the like. Other embodiments include entering and/or receiving the IADV inputs 111 using controls, buttons, or the like on a set-top box, a display device, a mobile device, combinations thereof, or the like.

It should be further understood that custom-made or custom-configured remote control devices can be used to provide the functionality of the remote control device 128 illustrated and described herein. It should be further understood, however, that almost any type of input/output device can be used to provide the functionality of the remote control device 128 illustrated and described herein and/or can be configured to operate interactively with the IADV application 108. For example, the remote control device 128 can be designed for use with the computing device 102 and can be provided by a particular content delivery provider and/or content delivery system, if desired. In such an arrangement, the remote control device 128 can include one or more buttons that can be configured for use with the IADV application 108. For example, the functionality of the remote control device 128 can be provided by other devices that can include a module or application.

In one contemplated embodiment, the functionality of the remote control device 128 can be provided by a mobile device that can communicate with the computing device 102 in various ways, such as via wireless communications, in order to provide the IADV inputs 111 to the computing device 102. In another example, the remote control device 128 can be configured as a sensor or number of sensors that can be in communication with the computing device 102. The sensor(s) can recognize particular movements, sounds, or motions to indicate entry of an IADV input 111. Because the IADV inputs 111 illustrated and described herein can be received or detected in additional or alternative manners, it should be understood that these examples are illustrative, and therefore should not be construed as being limiting in any way.

The IADV application 108 can be configured to detect an inadvertent viewing condition. The IADV application 108 also can be configured to take actions to alert users or other entities about the inadvertent viewing condition and/or to prevent the inadvertent viewing. The IADV application 108 can be configured to detect an inadvertent viewing condition including determining that an associated video display 103 of the computing device 102 is being turned on while the computing device 102 is recording media content portions of the media content 115 on a particular channel, and that the video display 103 (or device feeding display data to the video display 103) is tuned to the particular channel for displaying received media content in the form of the audio content 121 and the video content 123. The IADV application 108 can also be configured to detect an inadvertent viewing condition including determining that the computing device 102 has been tuned (or is being tuned) to a particular channel on which the computing device 102 is recording a program corresponding with the media content 115. In these and other situations, the user may be exposed to portions of the media content 115 associated with the program.

The IADV application 108 can also be configured to detect an inadvertent viewing condition that includes detecting a flag or other indication (hereinafter referred to as a "flag") 117. The flag 117 can be added to, associated with, and/or received with the media content 115, in some embodiments. The flag 117 also can be received separately from the media content 115. In any event, the flag 117 can identify the media content 115 as being at risk for possible inadvertent viewing. When a flag 117 exists, the inadvertent viewing condition can be detected regardless of whether or not the media content 115 is being recorded. According to one embodiment, the flag 117 can be added to the media content 115 or otherwise provided to the computing device 102 by a content provider, such as via the content server 116, or by other devices or entities. The flag 117 can be provided, for example, for various types of programming and/or various types of the media content 115 such as sports events, news, movies, television shows, and the like.

Upon detecting an inadvertent viewing condition, the IADV application 108 can be configured to block data from being provided to or output on the video display 103. Thus, for example, the IADV application 108 can block the audio content 121 and/or the video content 123 that would otherwise be provided to the video display 103. In some embodiments, for example, the computing device 102 can block the audio content 121 and/or the video content 123 by blocking the sending of audio and video outputs to the video display 103. In some other embodiments, the computing device 102 can block the audio content 121 and/or the video content 123 by substituting other content or outputs (also referred to herein as "substitute content" or "substitute output") for the audio content 121 and/or the video content 123. For example, the computing device 102 can substitute a blank screen or other content for the video content 123 and/or can substitute silence or other content for the audio content 121. In some embodiments, the computing device 102 can continue receiving and recording the media content 115 using the PVR application 161 while preventing output of the audio content 121 and the video content 123 to the video display 103. It should be understood that these examples are illustrative, and therefore should not be construed as being limiting in any way.

Figure 2:
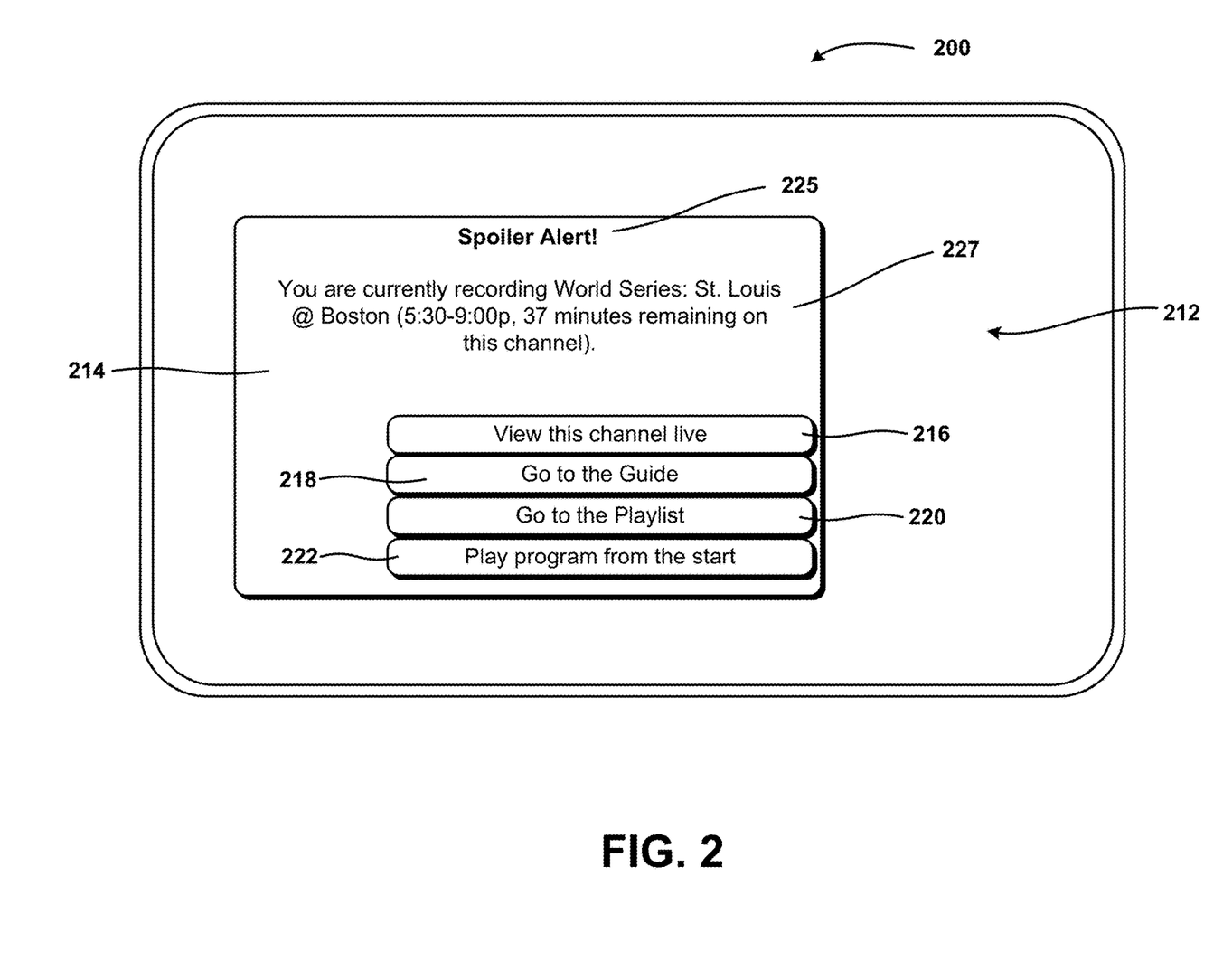
FIG. 2 is a user interface diagram showing aspects of providing an inadvertent viewing alert and obtaining a selectable option input, according to illustrative embodiments of the concepts and technologies described herein.
Figure 3:
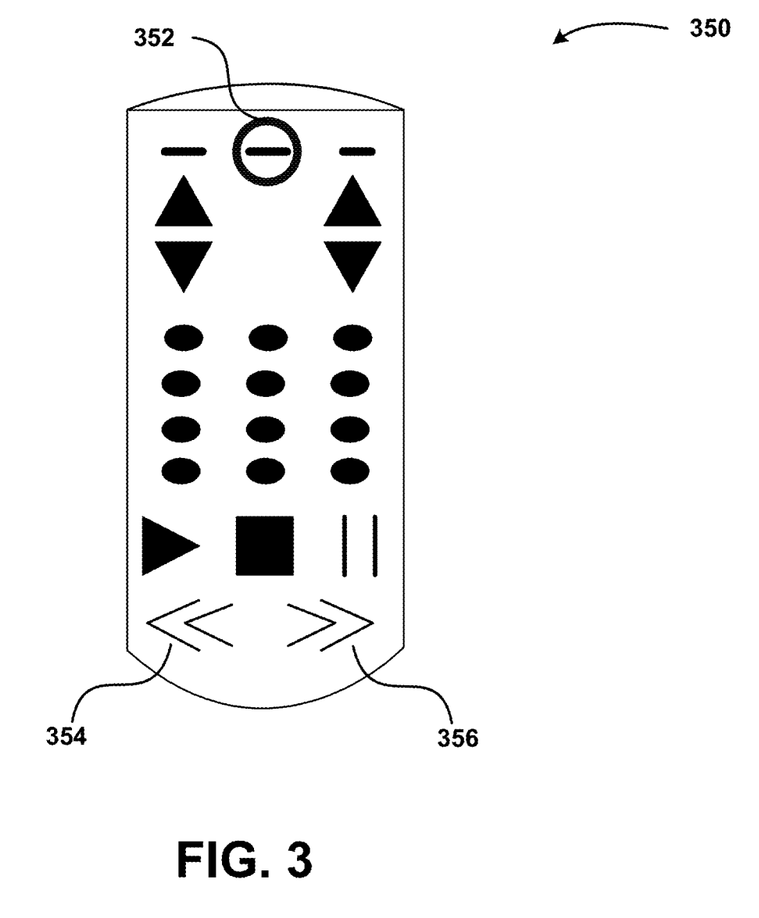
FIG. 3 shows an example input/output device according to some illustrative embodiments of the concepts and technologies described herein.

Referring now to FIG. 2, an example display 200 is shown, according to an example embodiment. In some embodiments, the display 200 can be shown on the video display 103, for example in response to the computing device 102 detecting an inadvertent viewing condition. Because the display 200 can be shown at additional and/or alternative times, it should be understood that this example is illustrative, and therefore should not be construed as being limiting in any way.

In the illustrated embodiment, the media content 115 can be shown in a display region 212 of the display 200. The IADV application 108 can create and provide to the video display 103 the user interface 214 for display on a portion of the display region 212. It should be understood that this example is illustrative, and therefore should not be construed as being limiting in any way. In some arrangements, the user interface 214 can be provided as a transparent, partially transparent, partially opaque, or opaque overlay, though this is not necessarily the case. If the user interface 214 is provided as a partially transparent overlay, portions of what is being displayed on the video display 103 underlying the user interface 214 can be viewed at the same time as the user interface 214, such as a blank screen substituted for the video content 123. It should be understood that this example is illustrative, and therefore should not be construed as being limiting in any way.

In the example configuration shown in FIG. 2, the user interface 214 can include an alert 225 and an alert description 227. The alert 225 and the alert description 227 can notify the user about the detected inadvertent view condition. The user interface 214 can further include selectable options for the user to consider in response to the alert 225 and/or other aspects of the user interface 214 being shown on the video display 103.

In the example embodiment shown in FIG. 2, the user interface 214 can be presented with a first option 216 to view the channel to which the video display 103 is tuned and a second option 218 to access a menu, guide, or other functionality. The user interface 214 also can be presented with other options such as, for example, a third option 220 to go to a playlist, a fourth option 222 to play the recorded program from the beginning, other options, or the like. With regard to the fourth option 222, it can be appreciated that playing the recorded program from the beginning can occur while the computing device 102 continues recording the media content 115. It should be understood that this example is illustrative, and therefore should not be construed as being limiting in any way.

The IADV application 108 can be executed by the computing device 102 to generate the user interface 214. In some embodiments of the concepts and technologies described herein, the IADV application 108 can generate the user interface 214. In some other embodiments of the concepts and technologies described herein, the IADV application 108 can generate the user interface 214 based on data that may be received from other devices. Because the user interface 214 can be generated at other devices and/or based on various types of data, it should be understood that these examples are illustrative, and therefore should not be construed as being limiting in any way.

FIG. 3 shows an example input/output device such as the remote control 350 according to some illustrative embodiments of the concepts and technologies described herein. The remote control 350 can include a TV remote control, a remote control for a video recorder (e.g., a DVR), a remote control for a set-top box, a remote control for the computing device 102, or the like. The remote control 350 can be used to provide the functionality illustrated and described for the remote control device 128 shown in FIG. 1, if desired.

The remote control 350 can be configured to receive inputs (e.g., from a user) and to provide corresponding input signals to a receiver or other interface of the computing device 102 or other device. In some embodiments, the remote control 350 can provide input signals to the receiver via infrared control signals or via other communication media such as wireless, wired, network, or other communication media. As shown, the remote control 350 can include an option selection key 352, which may be dedicated to the functionality illustrated and described herein with reference to the selecting an option on the user interface 214 and/or which may be a multi-function key that also can provide other functionality illustrated and described herein. The remote control 350 also can include navigation keys 354 and 356, in some embodiments. It should be understood that soft keys, touch screens, and/or other inputs are contemplated and are possible.

Figure 4:
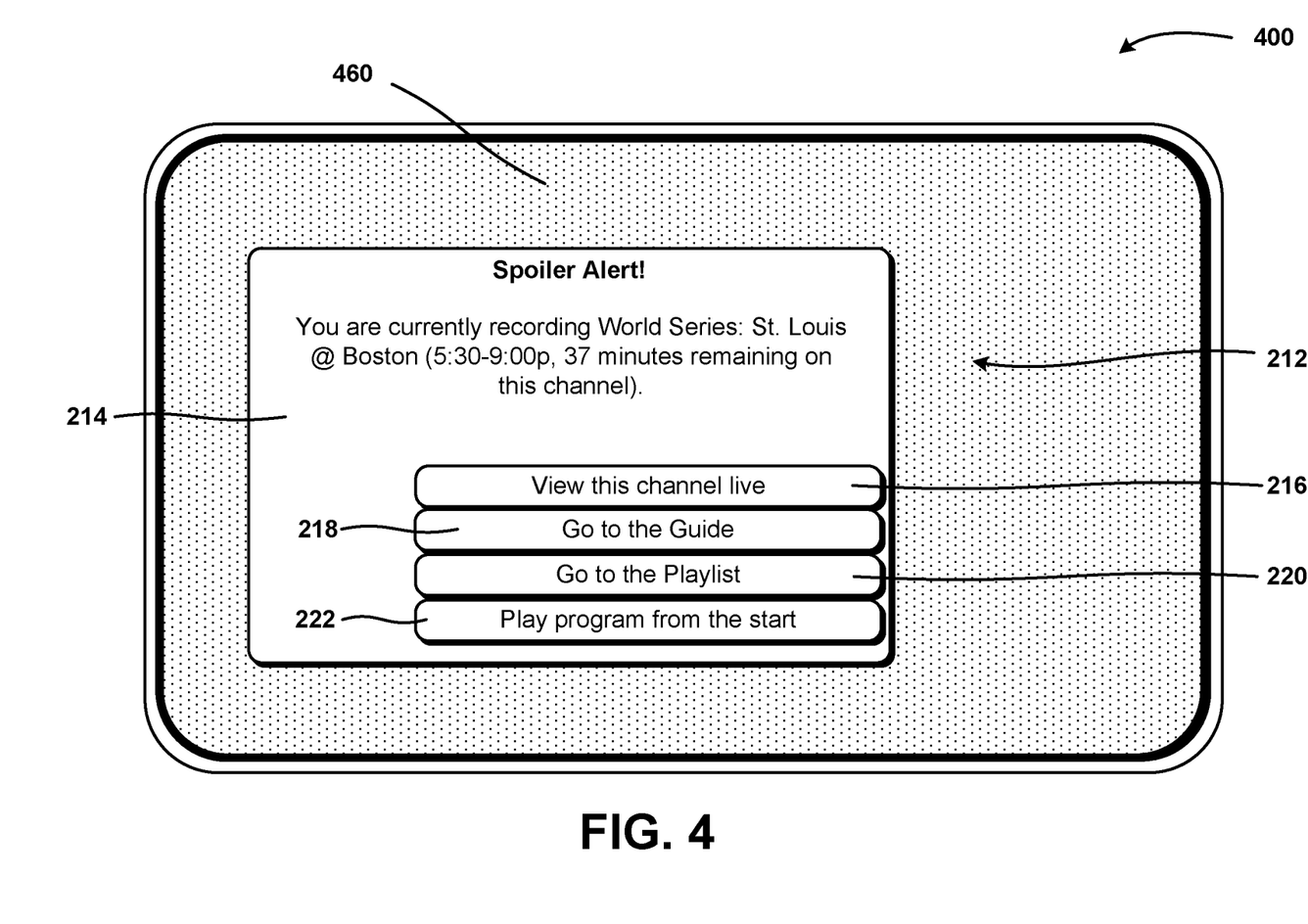
FIGS. 4 and 5 are user interface diagrams showing screen displays or portions thereof, according to some illustrative embodiments of the concepts and technologies described herein.
Figure 5:
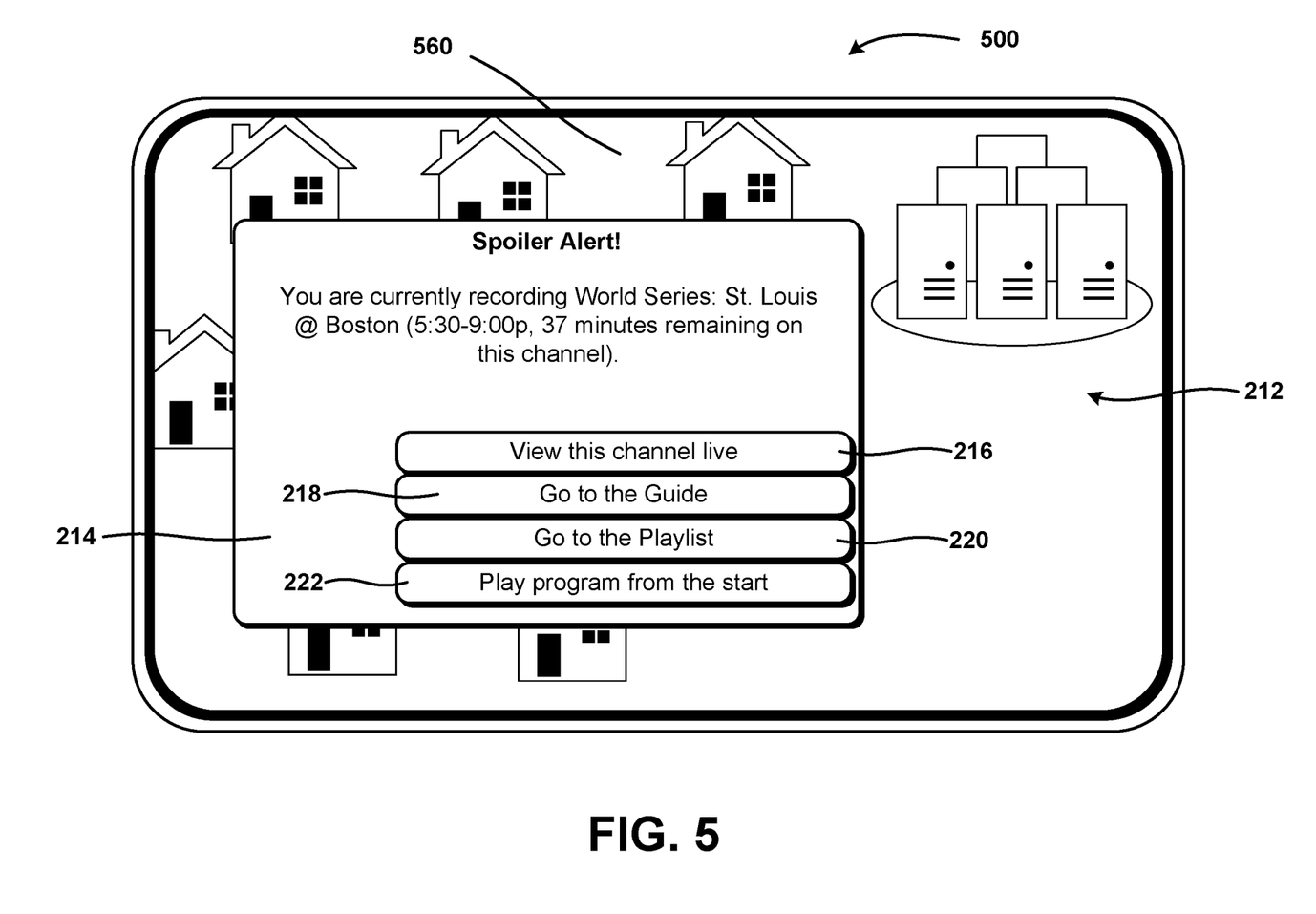

Referring now to FIGS. 4 and 5, additional configurations of example displays 400 and 500 are shown. Similar to FIG. 2, the displays 400 and 500 including the user interface 214 can also be displayed on the video display 103, and can include the same or similar aspects and features as the display 200 shown in FIG. 2 and/or can differ as explained below. In the examples of FIGS. 4 and 5, the media content being displayed on the display region 212 can include overlaid or substitute media content created by the IADV application 108 in order to block the presentation of audio and/or video information of a program to the user. In the example of FIG. 4, an overlay 460 is shown in the display region 212 over, or on top of, any other media content, which prevents the user from inadvertently viewing the other media content. For example, the overlay 460 can include a blank screen or colored screen (e.g., dark blue, gray, or other colored background).

Similarly, the computing device 102 can act to block audio data from being provided to the user along with video data, as explained above. Similarly, in the example of FIG. 5, substitute media content 560 can be shown in the display region 212, which can likewise be over, or on top of, any other media content and can act to block audio data from being provided to the user along with video data. For example, the substitute media content 560 can include a static background design and/or a graphic background, such as an animated graphic playing an advertisement or theme animation from the content provider.

Figure 6:
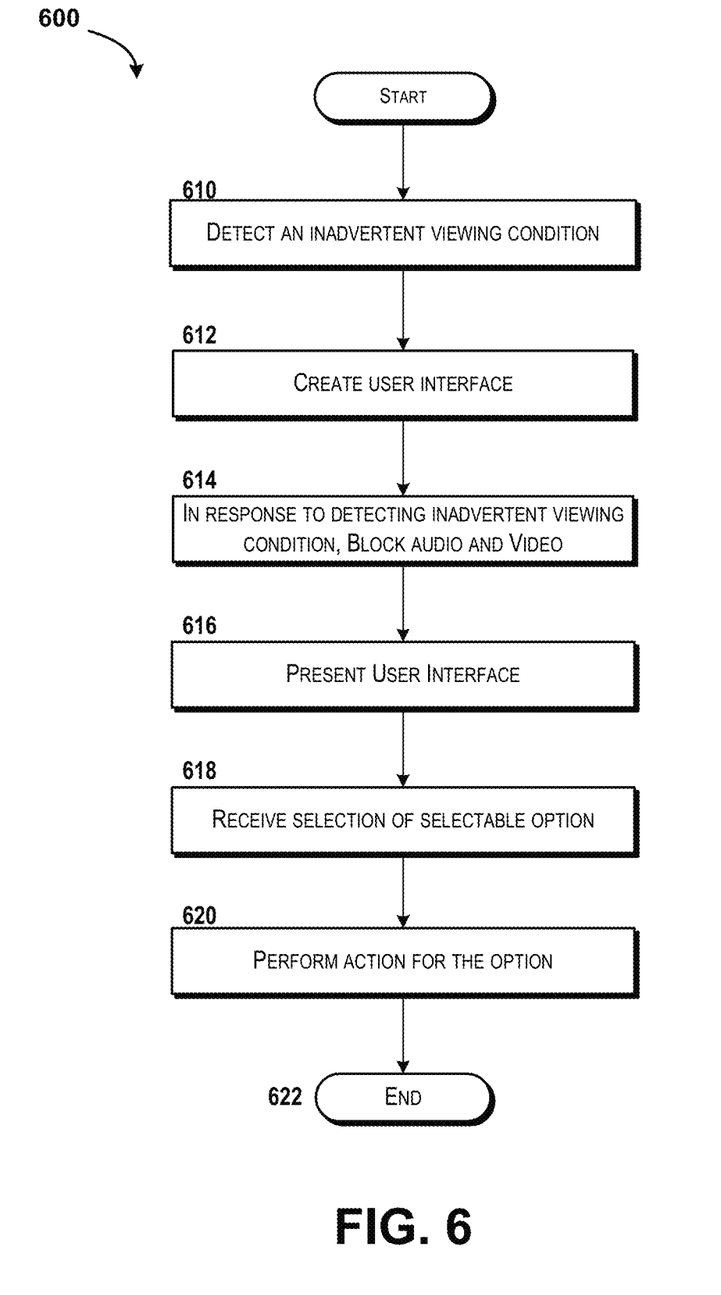
FIG. 6 is a method diagram that schematically illustrates a method for preventing inadvertent viewing of media content, according to some illustrative embodiments of the concepts and technologies described herein.

Turning now to FIG. 6, aspects of a method 600 for preventing inadvertent viewing of media content will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the computing device 102 and/or other devices or systems to perform one or more operations and/or causing the processor to direct other components of the computing system or device to perform one or more of the operations.

For purposes of illustrating and describing the concepts of the present disclosure, the method 600 disclosed herein is described as being performed by the computing device 102 via execution of one or more software modules such as, for example, the IADV application 108. It should be understood that additional and/or alternative devices and/or network nodes can provide the functionality described herein via execution of one or more modules, applications, and/or other software including, but not limited to, the IADV application 108. Thus, the illustrated embodiment is illustrative, and should not be viewed as being limiting in any way.

The method 600 begins at operation 610. At operation 610, the computing device 102 can detect an inadvertent viewing condition. In a first embodiment of an inadvertent viewing condition, the computing device 102 can determine that the tuner 160 is tuned to a first channel receiving the media content 115 for a corresponding program, which is being recorded by the PVR application 161. The computing device 102 can determine that the video display 103 is also receiving the audio content 121 and the video content 123 of the media content 115 that is being recorded with the PVR application 161. The computing device 102 can further determine that the video display 103 is being turned on, which can display the media content 115 being received for the program to the user and inadvertently expose the media content 115 of the program to the user.

In a second embodiment of an inadvertent viewing condition, the computing device 102 can determine that the first tuner 160 is tuned to a first channel receiving the media content 115 for a corresponding program, which is being recorded via the PVR application 161. For the second embodiment, however, the computing device 102 can determine that the user has entered a command to switch from displaying different media content on the video display 103 (e.g., displaying a recorded program, an on demand program, or a menu) to displaying the media content 115 for the first channel on the video display 103. This can correspond, for example, to a command entered. For example, a command can be entered via a selection of the first channel made using an on-screen guide (not shown) or by a command to exit from viewing different media content provided as an on-demand program or a recorded program and, thus, a request to switch to display on the video display 103 the media content 115 for the first channel to which the tuner 160 is tuned.

In a third embodiment of an inadvertent viewing condition, a multi-tuner version of the computing device 102 can determine that the first tuner 160 is being tuned from a second channel to the first channel associated with the media content 115, which is being recorded via a second tuner by the PVR application 161. According to some embodiments, the user can enter a command to switch from viewing, via the video display 103, different media content for a different media program on the second channel to viewing the media content 115 on the first channel, which is also the channel being recorded by the PVR application 161. The computing device 102 can thus determine that an inadvertent viewing condition for the video display 103 exists, which would expose the media content 115 to the user for the program being recorded.

In a fourth embodiment of an inadvertent viewing condition involving a flagged program according to operation 610, the tuner 160 is receiving the media content 115 that corresponds to a program that has been flagged by the content provider as being at risk for an inadvertent viewing condition. As explained above, the risk of an inadvertent viewing condition can be communicated via a flag such as the flag 117, e.g., via the addition of the flag 117 to the media content 115, the providing of the flag 117 with or separately from the media content 115, or the like. The computing device 102 can determine that the video display 103 is being turned on and would receive the media content 115 for the flagged media content or a flagged program. As used herein, a "flagged program" or "flagged media content" can include, for example, media content 115 or a program that has an associated flag 117. It should be understood that this example is illustrative, and therefore should not be construed as being limiting in any way.

Alternatively, as another example, the computing device 102 can determine that the user has entered a command to switch from displaying different media content on video display 103 (e.g., displaying a recorded program, an on-demand program, a menu or another channel) to display the flagged media content for the first channel on the video display 103. This can be a command entered, for example, via a selection to the first channel made using an on-screen guide (not shown) or by a command to exit from viewing different media content provided as an on-demand program or a recorded program, or to tune a second tuner to the first channel and, thus, a request to switch to display on the video display 103 the media content 115 for the first channel to which the tuner 160 is tuned. The flagged program can be for a live event, such as competitions in the Olympics or for a major sporting event, for which an inadvertent viewing condition can exist for many users. Instead of being recorded by the PVR application 161, the media content 115 can be recorded by the content provider and made available to viewers.

From operation 610, the method 600 can proceed to operation 612. At operation 612, the computing device 102 can create a user interface, such as the user interface 214 illustrated and described herein. The user interface 214 created in operation 612 can include an alert, such as the alert 225, for the user. As shown in FIG. 2, for example, the alert 225 can warn the user that the user may be inadvertently exposed to content of the media program. The alert 225 can notify the user about the detected inadvertent view condition and provide details. For example, the user interface 214 can also include, as part of the alert 225, an alert description, such as the alert description 227, describing the media program to which the user may be exposed to the media content. The user interface 214 can further include selectable options for the user to consider in response to the alert 225 and/or other aspects of the user interface 214 being shown on the video display 103.

As described above with reference to FIG. 2, the user interface 214 can be presented with a first option, such as the first option 216, to view the channel which the video display 103 is tuned and a second option, such as the second option 218, to access a menu or other functionality, such as to view a guide (not shown). The user interface 214 also can be presented with other options, such as the third option 220 to go to a playlist, the fourth option 222 to play the recorded program from the beginning, other options, or the like.

From operation 612, the method 600 can proceed to operation 614. At operation 614, the computing device 102 can, in response to detecting an inadvertent viewing condition, block audio and video information to the video display 103. In one embodiment, the computing device 102 can block the audio content 121 and the video content 123 associated with the media content 115 from being output to the video display 103. The computing device 102 can control an audio processing unit (not shown) and a video processing unit (not shown) to halt processing of the audio content 121 and the video content 123 for the video display 103. In an alternative arrangement, the computing device 102 can control hardware including switches or software to block sending the audio content 121 and the video content 123 to the video display 103.

In a further embodiment, the computing device 102 can block the media content 115 from being processed to send to the video display 103 while maintaining communications to allow a user interface to be presented to the user. For example, at operation 614 for the option illustrated in FIG. 4, the computing device 102 can present the overlay 460 to the video display 103 to be presented over or on top of any media content shown in the display region 212. For instance, a blank screen can be provided to the video display 103 by the computing device 102 to block the video content 123, and output can be provided by the computing device 102 to the video display 103 for silencing the audio content 121. Similarly, in the example of FIG. 5, the substitute media content 560 is shown in the display region 212, which computing device 102 can present on the video display 103 as a mask over the video content 123 and the audio content 121. It should be noted that in some embodiments of the concepts and technologies disclosed herein, that substitute media content 560 can be output instead of the audio content 121 and/or the video content 123 and/or instead of "blocking" output per se. It should be understood that this example is illustrative, and therefore should not be construed as being limiting in any way.

From operation 614, the method 600 can proceed to operation 616. At operation 616, the computing device 102 can present the user interface 214 to the user via the video display 103. The computing device 102 can present the user interface 214 to the video display 103 including sending the audio content 121 and the video content 123 to video display 103. According to some embodiments, as noted above along with operation 614, the user interface 214 can act as the substitute media content 560 provided by the computing device 102 to the video display 103 by overlaying the video content 123 of a program provided to the video display 103.

From operation 616, the method 600 can proceed to operation 618 where the computing device 102 can receive selection of one or more of the options 216, 218, 220, and/or 222 presented to the user via the user interface 214. The computing device 102 can receive selection of one or more of the options 216, 218, 220, and/or 222 through user interactions with the remote control 350.

From operation 618, the method 600 can proceed to operation 620. At operation 620, the computing device 102 can perform the action corresponding to the selected option (e.g., an input received from the user). For example, according to the options shown in FIG. 2, the computing device 102 can view the first channel and the media program live, display the guide, go to the playlist of recorded programs, or play the media program from the start.

From operation 620, the method 600 can proceed to operation 622. The method 600 can end at operation 622.

Figure 7:
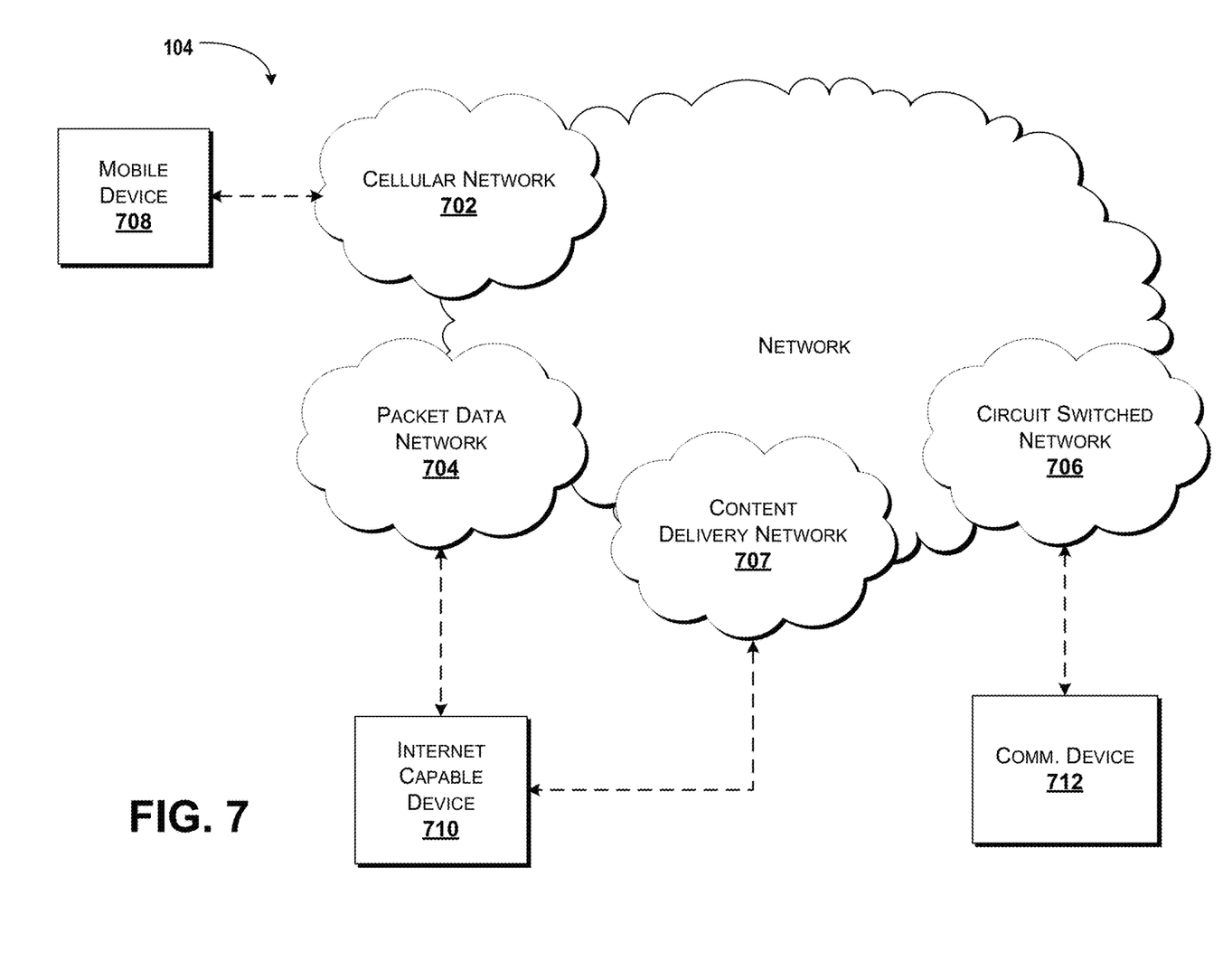
FIG. 7 schematically illustrates a network, according to an illustrative embodiment of the concepts and technologies described herein.

Turning now to FIG. 7, additional details of the network 104 are illustrated, according to an illustrative embodiment. The network 104 can include a cellular network 702, a packet data network 704, for example, the Internet, a circuit switched network 706, for example, a publicly switched telephone network ("PSTN"), and a content delivery network 707, for example a television delivery network, or the like, which can complement or traverse one or more of the cellular network 702, the packet data network 704, and/or the circuit switched network 706. The cellular network 702 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 702 also includes radios and nodes for receiving and transmitting voice, data, and combinations thereof to and from radio transceivers, networks, the packet data network 704, and the circuit switched network 706.

A mobile communications device 708, such as, for example, a cellular telephone, a user equipment, a mobile terminal, a PDA, a laptop computer, a handheld computer, and combinations thereof, can be operatively connected to the cellular network 702. The cellular network 702 can be configured as a 2G GSM network and can provide data communications via GPRS and/or EDGE. Additionally, or alternatively, the cellular network 702 can be configured as a 3G UMTS network and can provide data communications via the HSPA protocol family, for example, HSDPA, EUL (also referred to as HSUPA), and HSPA+. The cellular network 702 also is compatible with 4G mobile communications standards as well as evolved and future mobile standards.

The packet data network 704 includes various devices, for example, servers, computers, databases, and other devices in communication with one another, as is generally known. The packet data network 704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 704 includes or is in communication with the Internet. The circuit switched network 706 includes various hardware and software for providing circuit switched communications. The circuit switched network 706 may include, or may be, what is often referred to as a plain old telephone system ("POTS"). The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable devices 710, for example, a PC, a laptop, a portable device, or another suitable device, can communicate with one or more cellular networks 702, and devices connected thereto, through the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, a telephone, facsimile machine, modem, computer, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710. In the specification, the network 104 is used to refer broadly to any combination of the networks 702, 704, 706, 707. It should be appreciated that substantially all of the functionality described with reference to the network 104 can be performed by the cellular network 702, the packet data network 704, the circuit switched network 706, and/or the content delivery network 707, alone or in combination with other networks, network elements, and the like.

Figure 8:
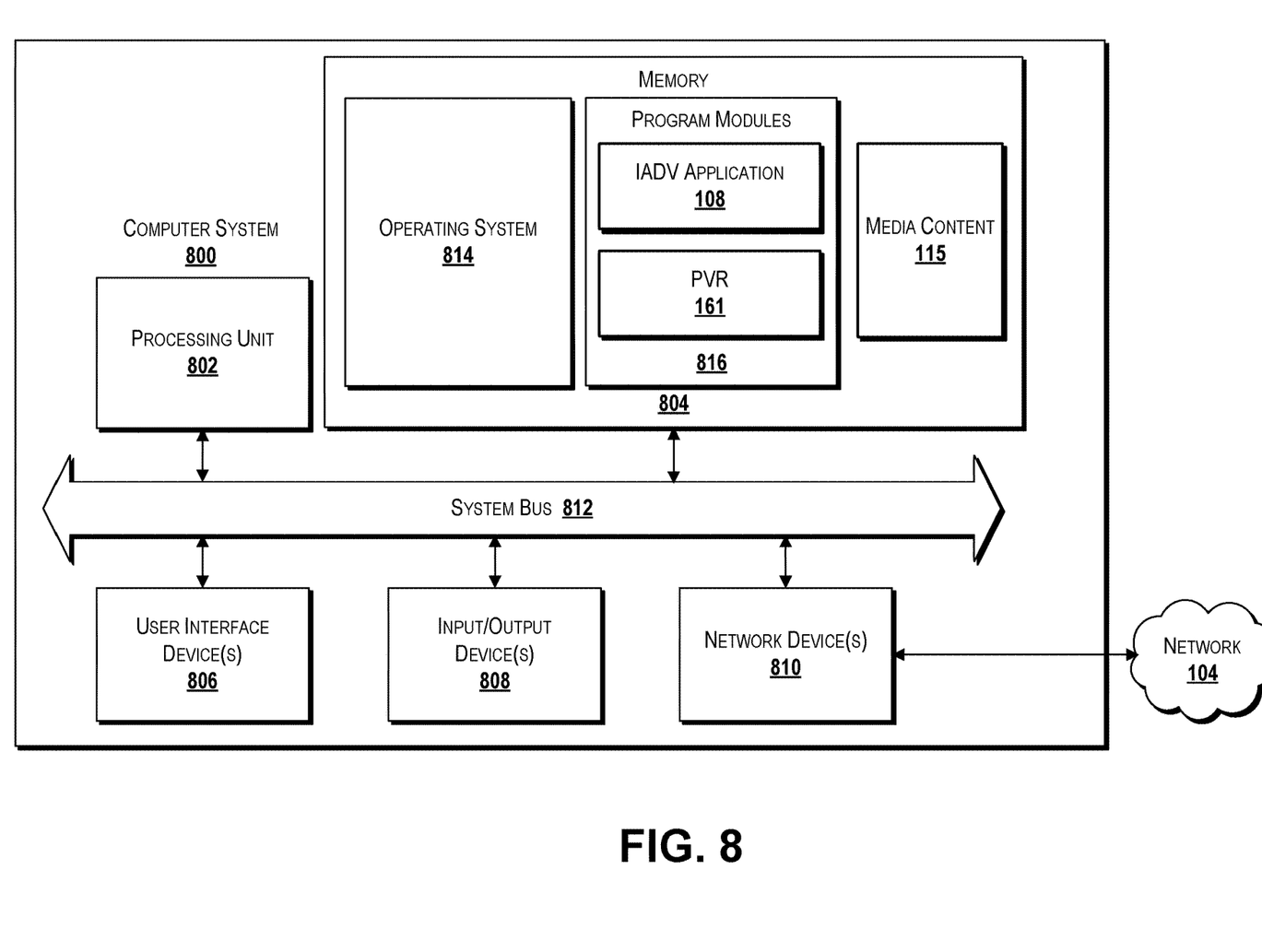
FIG. 8 is a block diagram illustrating an example computing device, according to some illustrative embodiments of the concepts and technologies described herein.

Referring now to FIG. 8, a block diagram is shown illustrating a computer system 800 configured to provide the functionality described herein for generating and providing relative IADV application indicators, in accordance with various embodiments of the concepts and technologies disclosed herein. In some embodiments, the architecture shown in FIG. 8 can correspond to the devices illustrated and described herein with respect to the computing device 102 and/or the content server 116, though this is not necessarily the case. The computer system 800 includes a processing unit 802, a memory 804, one or more user interface devices 806, one or more input/output ("I/O") devices 808, and one or more network devices 810, each of which is operatively connected to a system bus 812. The bus 812 enables bi-directional communication between the processing unit 802, the memory 804, the user interface devices 806, the I/O devices 808, and the network devices 810.

The processing unit 802 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 804 communicates with the processing unit 802 via the system bus 812. In some embodiments, the memory 804 is operatively connected to a memory controller (not shown) that enables communication with the processing unit 802 via the system bus 812. The memory 804 includes an operating system 814 and one or more program modules 816, which can include the IADV application 108 and/or the PVR application 161. The operating system 814 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 816 may include various software and/or program modules described herein. In some embodiments, for example, the program modules 816 can include the IADV application 108 and/or the content delivery application 114. These and/or other programs can be embodied in computer-readable media containing instructions that, when executed by the processing unit 802, perform one or more of the method 600 described in detail above with respect to FIG. 6. According to embodiments, the program modules 816 may be embodied in hardware, software, firmware, or any combination thereof. Although not shown in FIG. 8, it should be understood that the memory 804 also can be configured to store user interface data, the media content 115, the flag 117, preferences and/or settings for flagging programs, and/or other data, if desired.

By way of example, and not limitation, computer-readable media may include any available computer storage media or communication media that can be accessed by the computer system 800. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 800. In the claims, the phrase "computer storage medium" and variations thereof does not include waves or signals per se and/or communication media.

The user interface devices 806 may include one or more devices with which a user accesses the computer system 800. The user interface devices 806 may include, but are not limited to, computers, servers, personal digital assistants, cellular phones, or any suitable computing devices. The I/O devices 808 enable a user to interface with the program modules 816. In one embodiment, the I/O devices 808 are operatively connected to an I/O controller (not shown) that enables communication with the processing unit 802 via the system bus 812. The I/O devices 808 may include one or more input devices, such as, but not limited to, a keyboard, a mouse, or an electronic stylus. Further, the I/O devices 808 may include one or more output devices, such as, but not limited to, a display screen or a printer.

The network devices 810 enable the computer system 800 to communicate with other networks or remote systems via a network, such as the network 104. Examples of the network devices 810 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for preventing inadvertent viewing of media content have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
a computing device comprising a processor; and
a memory that stores computer-executable instructions that, when executed by the processor, cause the processor to perform operations comprising:
receiving, from a content server and at the computing device, media content, wherein the media content comprises audio content and video content that corresponds to a first media program, and wherein the first media program is associated with a first channel,
receiving, from the content server and at the computing device, an inadvertent view risk flag that is received separately from the media content, wherein the inadvertent view risk flag indicates that the first media program is at risk for possible inadvertent viewing,
detecting, while the first media program is being recorded by the computing device and while a second media program is being displayed on a video display associated with the computing device, receipt of a command that will result in a display of the first media program on the video display, wherein the second media program is associated with a second channel, and wherein the command comprises a command to turn on the video display while the computing device is recording the first media program on the first channel and while a tuner of the computing device is tuned to the first channel, and
in response to detecting receipt of the command and detecting the inadvertent view risk flag,
creating, by the computing device, an alert that indicates that a user may be inadvertently exposed to the first media program,
blocking, by the computing device, output of the audio content and the video content to the video display while continuing to record the first media program by the computing device, and
allowing, by the computing device, presentation of a user interface on the video display, wherein the user interface presents the alert on the video display while the audio content and the video content are blocked from being provided to the video display.

2. The system of claim 1, wherein the audio content and the video content are blocked from being processed while maintaining communications that allow the user interface to be presented.

3. The system of claim 1, wherein the computing device is a set-top box.

4. The system of claim 1, wherein the first media program corresponds to a broadcast of a live event.

5. The system of claim 1, wherein blocking output of the audio content and the video content from the first media program from being provided to the video display comprises controlling device circuitry of the computing device to block the audio content and the video content from the first media program from being provided to the video display.

6. The system of claim 1, wherein the computer-executable instructions, when executed by the processor, cause the processor to perform operations further comprising:
providing a substitute media content to the video display.

7. The system of claim 1, wherein the user interface comprises:
a first selectable option to view the first channel,
a second selectable option to tune to a guide,
a third selectable option to view a playlist menu, and
a fourth selectable option to watch the first media program being recorded from a beginning of the first media program being recorded.

8. A method comprising:
receiving, at a computing device and from a content server, media content, wherein the media content comprises audio content and video content that corresponds to a first media program, and wherein the first media program is associated with a first channel;
receiving, at the computing device and from the content server, an inadvertent view risk flag that is received separately from the media content, wherein the inadvertent view risk flag indicates that the first media program is at risk for possible inadvertent viewing;
detecting, at the computing device, while the first media program is being recorded by the computing device, and while a second media program is being displayed on a video display associated with the computing device, receipt of a command that will result in a display of the first media program on the video display, wherein the second media program is associated with a second channel, and wherein the command comprises a command to turn on the video display while the computing device is recording the first media program on the first channel and while a tuner of the computing device is tuned to the first channel; and in response to detecting receipt of the command and detecting the inadvertent view risk flag,
- creating, by the computing device, an alert that indicates that a user may be inadvertently exposed to the first media program,
- blocking, by the computing device, output of the audio content and the video content to the video display while continuing to record the first media program by the computing device, and
- allowing, by the computing device, presentation of a user interface on the video display, wherein the user interface presents the alert on the video display while the audio content and the video content are blocked from being provided to the video display.

9. The method of claim 8, wherein the computing device is a set-top box.

10. The method of claim 8, wherein the first media program corresponds to a broadcast of a live event.

11. The method of claim 8, wherein blocking output of the audio content and the video content from the first media program from being provided to the video display comprises controlling device circuitry of the computing device to block the audio content and the video content from the first media program from being provided to the video display.

12. The method of claim 8, further comprising providing, at the computing device, a substitute media content to the video display.

13. The method of claim 8, wherein the user interface comprises:
- a first selectable option to view the first channel;
- a second selectable option to tune to a guide;
- a third selectable option to view a playlist menu; and
- a fourth selectable option to watch the first media program being recorded from a beginning of the first media program being recorded.

14. A computer storage medium having computer-executable instructions stored thereon that, when executed by a processor of a device, cause the processor to perform operations comprising:
- receiving, from a content server and at a computing device, media content, wherein the media content comprises audio content and video content that corresponds to a first media program, and wherein the first media program is associated with a first channel;
- receiving, from the content server and at the computing device, an inadvertent view risk flag that is received separately from the media content, wherein the inadvertent view risk flag indicates that the first media program is at risk for possible inadvertent viewing;
- detecting, while the first media program is being recorded by the computing device and while a second media program is being displayed on a video display associated with the computing device, receipt of a command that will result in a display of the first media program on the video display, wherein the second media program is associated with a second channel, and wherein the command comprises a command to turn on the video display while the computing device is recording the first media program on the first channel and while a tuner of the computing device is tuned to the first channel; and
- in response to detecting receipt of the command and detecting the inadvertent view risk flag,
  - creating, by the computing device, an alert that indicates that a user may be inadvertently exposed to the first media program,
  - blocking, by the computing device, output of the audio content and the video content to the video display while continuing to record the first media program by the computing device, and
  - allowing, by the computing device, presentation of a user interface on the video display, wherein the user interface presents the alert on the video display while the audio content and the video content are blocked from being provided to the video display.

15. The computer storage medium of claim 14, wherein the computing device is a set-top box.

16. The computer storage medium of claim 14, wherein the first media program corresponds to a broadcast of a live event.

17. The computer storage medium of claim 14, wherein blocking output of the audio content and the video content from the first media program from being provided to the video display comprises controlling device circuitry of the computing device to block the audio content and the video content from the first media program from being provided to the video display.

18. The computer storage medium of claim 14, wherein the computer-executable instructions, when executed by the processor, cause the processor to perform operations further comprising:
providing a substitute media content to the video display.

19. The computer storage medium of claim 14, wherein the user interface comprises:
- a first selectable option to view the first channel;
- a second selectable option to tune to a guide;
- a third selectable option to view a playlist menu; and
- a fourth selectable option to watch the first media program being recorded from a beginning of the first media program being recorded.

* * * * *